(12) United States Patent
Luo et al.

(10) Patent No.: US 10,691,253 B2
(45) Date of Patent: Jun. 23, 2020

(54) TOUCH-CONTROL SCREEN, DRIVING METHOD, AND TOUCH-CONTROL APPARATUS

(71) Applicant: Xiamen Tianma Micro-electronics Co., Ltd., Xiamen (CN)

(72) Inventors: Sijian Luo, Xiamen (CN); Yin Sun, Xiamen (CN); Yumin Xu, Xiamen (CN)

(73) Assignee: XIAMEN TIANMA MICRO-ELECTRONICS CO., LTD., Xiamen (CN)

(*) Notice: Subject to any disclaimer, the term of this patent is extended or adjusted under 35 U.S.C. 154(b) by 0 days.

(21) Appl. No.: 16/197,720

(22) Filed: Nov. 21, 2018

(65) Prior Publication Data
US 2019/0235693 A1 Aug. 1, 2019

(30) Foreign Application Priority Data
Jan. 30, 2018 (CN) .......................... 2018 1 0090111

(51) Int. Cl.
*G06F 3/044* (2006.01)
*G06F 3/041* (2006.01)
(52) U.S. Cl.
CPC ............ *G06F 3/0416* (2013.01); *G06F 3/044* (2013.01)
(58) Field of Classification Search
CPC ......... G06F 2203/04103; G06F 3/0416; G06F 3/044; G06F 3/0443
USPC .................................................. 345/170–178
See application file for complete search history.

(56) References Cited

U.S. PATENT DOCUMENTS

| | | | |
|---|---|---|---|
| 2015/0135108 A1* | 5/2015 | Pope .................. | G06K 9/00006 715/767 |
| 2015/0235594 A1* | 8/2015 | Lombardi ............ | G09G 3/3208 345/173 |
| 2016/0246396 A1* | 8/2016 | Dickinson ........... | G06F 3/03545 |
| 2017/0046006 A1* | 2/2017 | Kim .................... | G02F 1/13338 |
| 2018/0217710 A1* | 8/2018 | Cholasta ............... | G06F 3/0416 |

FOREIGN PATENT DOCUMENTS

CN 101702106 A 5/2010

* cited by examiner

*Primary Examiner* — Tony O Davis
(74) *Attorney, Agent, or Firm* — Anova Law Group PLLC (57) ABSTRACT

Touch-control screen, driving method thereof, and touch-control apparatus are provided. The touch-control screen includes a touch-control area and a driving unit. The touch-control area includes a main touch-control area and an auxiliary touch-control area smaller than the main touch-control area. The touch-control area further includes a plurality of touch-control electrodes, having a plurality of first touch-control electrodes in the main touch-control area and a plurality of second touch-control electrodes in the auxiliary touch-control area. In a touch-control stage, the driving unit is configured to transmit electrical signals respectively to the plurality of first touch-control electrodes in the main touch-control area and to the plurality of second touch-control electrodes in the auxiliary touch-control area. A unit power consumption of the plurality of second touch-control electrodes in the auxiliary touch-control area is smaller than a unit power consumption of the plurality of first touch-control electrodes in the main touch-control area.

20 Claims, 6 Drawing Sheets

TOUCH-CONTROL SCREEN, DRIVING METHOD, AND TOUCH-CONTROL APPARATUS

CROSS-REFERENCES TO RELATED APPLICATIONS

This application claims the priority of Chinese Patent Application No. 201810090111.4, filed on Jan. 30, 2018, the entire contents of which are incorporated herein by reference.

FIELD OF THE DISCLOSURE

The present disclosure generally relates to the field of touch control technology and, more particularly, relates to a touch-control screen, a driving method of the touch-control screen, and a touch-control apparatus containing the touch-control screen.

BACKGROUND

A touch-control screen often includes a plurality of touch-control electrodes, which are used to detect touch-control information.

However, the touch-control accuracy of the touch-control screen needs to be improved. One method for improving the touch-control accuracy is to reduce the area occupied by the touch-control electrode. When the screen area of the touch-control screen is fixed, the reduction of the area occupied by the touch-control electrode substantially increases the number of the touch-control electrodes, thereby substantially increasing the power consumption of the touch-control screen.

Thus, there is a need for reducing the power consumption of the touch-control screen. The disclosed touch-control screen, driving method, and touch-control apparatus are directed to solve one or more problems set forth above and other problems.

BRIEF SUMMARY OF THE DISCLOSURE

One aspect of the present disclosure provides a touch-control screen. The touch-control screen includes a touch-control area and a driving unit. The touch-control area includes a main touch-control area and an auxiliary touch-control area smaller than the main touch-control area. The touch-control area further includes a plurality of touch-control electrodes. The plurality of touch-control electrodes includes a plurality of first touch-control electrodes in the main touch-control area and a plurality of second touch-control electrodes in the auxiliary touch-control area. In a touch-control stage, the driving unit is configured to transmit electrical signals respectively to the plurality of first touch-control electrodes in the main touch-control area and to the plurality of second touch-control electrodes in the auxiliary touch-control area. A unit power consumption of the plurality of second touch-control electrodes in the auxiliary touch-control area is smaller than a unit power consumption of the plurality of first touch-control electrodes in the main touch-control area.

Another aspect of the present disclosure provides a touch-control apparatus, including a disclosed touch-control screen. The touch-control area includes a main touch-control area and an auxiliary touch-control area smaller than the main touch-control area. The touch-control area further includes a plurality of touch-control electrodes. The plurality of touch-control electrodes includes a plurality of first touch-control electrodes in the main touch-control area and a plurality of second touch-control electrodes in the auxiliary touch-control area. In a touch-control stage, the driving unit is configured to transmit electrical signals respectively to the plurality of first touch-control electrodes in the main touch-control area and to the plurality of second touch-control electrodes in the auxiliary touch-control area. A unit power consumption of the plurality of second touch-control electrodes in the auxiliary touch-control area is smaller than a unit power consumption of the plurality of first touch-control electrodes in the main touch-control area.

Another aspect of the present disclosure provides a method of driving a touch-control screen. The touch-control screen includes a touch-control area and a driving unit. The touch-control area includes a main touch-control area and an auxiliary touch-control area smaller than the main touch-control area. The touch-control area further includes a plurality of touch-control electrodes, the plurality of touch-control electrodes including a plurality of first touch-control electrodes in the main touch-control area and a plurality of second touch-control electrodes in the auxiliary touch-control area. The method includes, in a touch-control stage, transmitting electrical signals respectively to the plurality of first touch-control electrodes in the main touch-control area and to the plurality of second touch-control electrodes in the auxiliary touch-control area. A unit power consumption of the plurality of second touch-control electrodes in the auxiliary touch-control area is smaller than a unit power consumption of the plurality of first touch-control electrodes in the main touch-control area.

Other aspects of the present disclosure can be understood by those skilled in the art in light of the description, the claims, and the drawings of the present disclosure.

BRIEF DESCRIPTION OF THE DRAWINGS

To more clearly illustrate the technical solution in the present disclosure, the accompanying drawings used in the description of the disclosed embodiments are briefly described hereinafter. Obviously, the drawings described below are merely some embodiments of the present disclosure. Other drawings may be derived from such drawings by a person with ordinary skill in the art without creative efforts.

DETAILED DESCRIPTION

To make the foregoing objectives, features and advantages of the present disclosure clearer and more understandable, the present disclosure will be further described with reference to the accompanying drawings and embodiments. However, exemplary embodiments may be embodied in various forms and should not be construed as limited to the embodiments set forth herein. Rather, these embodiments are provided to fully convey the thorough and complete concepts of the exemplary embodiments to those skilled in the art. The same reference labels and numerals in the drawings denote the same or similar structures and will not be described repetitively. The words and expressions of the positions and directions in the description of the present disclosure are illustrative with the pertaining drawings. However, changes may be made if necessary, and all the changes should be included in the scope of protection of the present disclosure. The drawings of the present disclosure are intended only to illustrate relative position relationship. Thicknesses of layers of certain parts may be enlarged for the convenience of comprehension and may not represent the proportional relationship of the thicknesses of the actual layers.

It should be noted that the specific details set forth in the following description are intended for those skilled in the art to fully understand the present disclosure. However, the present disclosure may be embodied in various other forms. Those skilled in the art may derive other embodiments without departing from the spirit of the present disclosure. Thus, the present disclosure should not be limited to the disclosed embodiments. When certain terms are used to denote certain structures in the specification and the claims, those skilled in the art should understand that hardware manufacturers may use different terms to refer to the same structures. The specification and the claims may not differentiate the structures according to the terminology difference, but rather, according to the functionality difference. When the specification and the claims use the word "comprising" as an open-ended term, it should be interpreted as "including but not limited to". The following specification describes various preferred embodiments of the present disclosure. However, such description is intended to illustrate the general principles of the present disclosure, and is not intended to limit the scope of the present disclosure. The scope of the present disclosure shall be determined by the appended claims.

Figure 1:
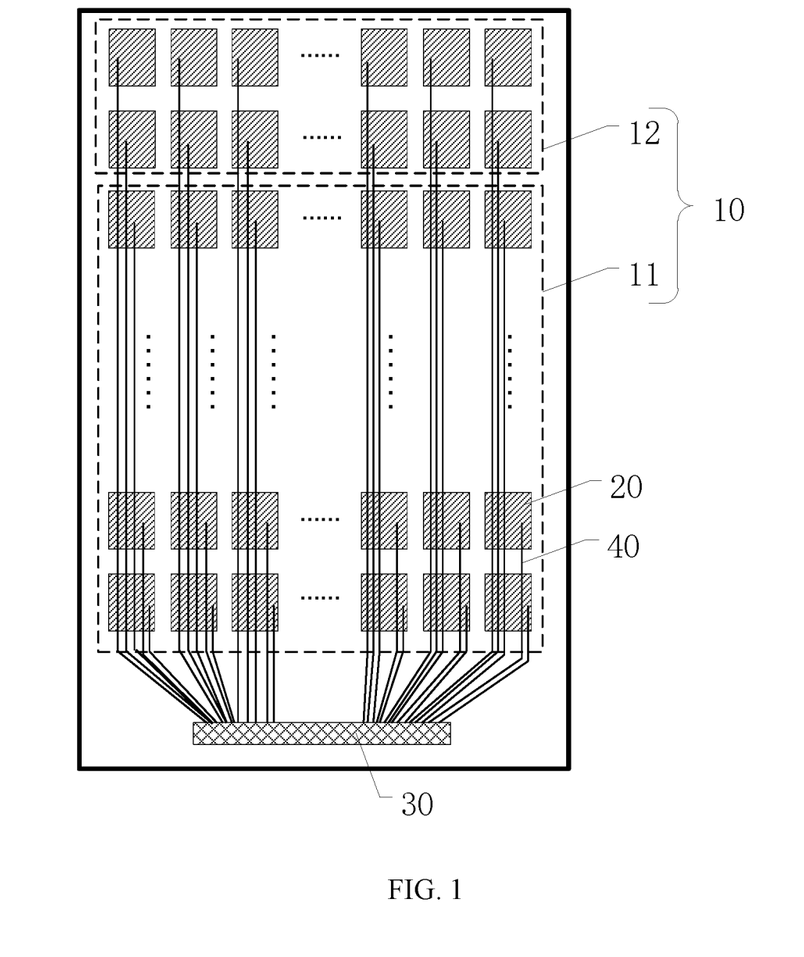
FIG. 1 illustrates a planar structural view of an exemplary touch-control screen according to disclosed embodiments.

FIG. 1 illustrates a planar structural view of an exemplary touch-control screen according to disclosed embodiments. As shown in FIG. 1, the touch-control screen may include a touch-control area 10. The touch-control area 10 may include a plurality of touch-control electrodes 20. The touch-control area 10 may include a main touch-control area 11 and an auxiliary touch-control area 12. The auxiliary touch-control area 12 may be smaller than the main touch-control area 11. The plurality of touch-control electrodes 20 may include a plurality of first touch-control electrodes 20 in the main touch-control area 11 and a plurality of second touch-control electrodes 20 in the auxiliary touch-control area 12. The touch-control screen may also include a driving unit 30. In a touch-control stage of the touch-control screen, the driving unit 30 may respectively transmit electronic signals to the plurality of first touch-control electrodes 20 in the main touch-control area 11 and the plurality of second touch-control electrodes 20 in the auxiliary area 12, such that a unit power consumption of the plurality of second touch-control electrodes 20 in the auxiliary touch-control area 12 is smaller than a unit power consumption of the plurality of first touch-control electrodes 20 in the main touch-control area 11.

The present disclosure provides a touch-control screen having a touch-control function. Using a touch object to approach or touch the touch-control screen may cause the touch-control screen to execute pre-defined operations. The touch object may be a finger or a touch stylus, etc.

In one embodiment, the touch-control screen may have a display function and may display corresponding image information in response to the touch operation by the touch object. In another embodiment, the structure of the display function may be a liquid crystal display panel or an organic light-emitting display panel. The present disclosure does not limit the structure of the display function.

In one embodiment, the touch-control screen may include a touch-control area 10. The touch-control area 10 may be an area having a touch-control function. In another embodiment, the touch-control area 10 may be at least partially overlapping with an area having a display function.

The touch-control area 10 may include the plurality of first touch-control electrodes 20 and the plurality of second touch-control electrodes 20. The plurality of first touch-control electrodes 20 and the plurality of second touch-control electrodes 20 may be made of conductive material. In one embodiment, the plurality of first touch-control electrodes 20 and the plurality of second touch-control electrodes 20 may be transparent. For example, the plurality of first touch-control electrodes 20 and the plurality of second touch-control electrodes 20 may be made of any one, two or more of indium gallium zinc oxide, indium zinc oxide, indium tin oxide, and indium tin zinc oxide, which is not limited by the present disclosure. The plurality of first touch-control electrodes 20 and the plurality of second touch-control electrodes 20 may also be made of opaque material, for example, metallic material.

As shown in FIG. 1, the plurality of first touch-control electrodes 20 and the plurality of second touch-control electrodes 20 may have a rectangular shape for illustrative purposes. The shape and size of the touch-control electrode 20 are not limited by the present disclosure.

It should be noted that the plurality of first touch-control electrodes 20 and the plurality of second touch-control electrodes 20 may operate in a self-capacitance mode or a mutual capacitance mode. In one embodiment, for illustrative purposes, the plurality of first touch-control electrodes 20 and the plurality of second touch-control electrodes 20 may operate in the self-capacitance mode. For example, the touch-control screen may include a plurality of touch-control signal lines 40. Each of the plurality of first touch-control electrodes 20 and the plurality of second touch-control electrodes 20 may be electrically connected to at least one touch-control signal line 40, and each touch-control signal line 40 may be electrically connected to only one of the plurality of first touch-control electrodes 20 and the plurality of second touch-control electrodes 20.

As shown in FIG. 1, the structure may be used in an in-cell touch panel. The in-cell touch panel may refer to forming the first touch-control electrode 20 or the second touch-control electrode 20 in a cell. The plurality of first touch-control electrodes 20 and the plurality of second touch-control electrodes 20 may be formed by dividing a display common electrode horizontally and vertically. When operating in a display stage, the first touch-control electrode 20 or the second touch-control electrode 20 may operate as a liquid crystal common electrode and may output a common voltage. When operating in a touch-control detection stage, the plurality of first touch-control electrodes 20 and the plurality of second touch-control electrodes 20 may be configured to scan and detect any touch-control operation.

In the touch-control stage of the touch-control screen, the touch-control signal line 40 may transmit a touch-control signal to the first touch-control electrode 20 or the second touch-control electrode 20. The touch-control signal may often be a pulse signal. When the first touch-control electrode 20 or the second touch-control electrode 20 detects any touch-control operation, a coupling capacitance formed between the first touch-control electrode 20 and a ground or between the second touch-control electrode 20 and the ground may change. The capacitance change may cause a change of an electric charge held by the first touch-control electrode 20 or the second touch-control electrode 20. The change of the electric charge may cause a change of an electric current. The touch-control signal line 40 may output the change of the electric current. The driving unit 30 may calculate the electric current change to determine touch-control operation information. The operation mode of the first touch-control electrode 20 or the second touch-control electrode 20 may be called the self-capacitance mode. In one embodiment, the plurality of first touch-control electrodes 20 and the plurality of second touch-control electrodes 20 of the touch-control screen may operate in the self-capacitance mode. In another embodiment, the plurality of first touch-control electrodes 20 and the plurality of second touch-control electrodes 20 may be disposed in a same film layer. Only one electrode layer may be needed to implement the touch-control function of the touch-control screen, thereby making the touch-control screen light and thin.

In one embodiment, the touch-control screen may include the driving unit 30. The driving unit 30 may supply the touch-control signals to the plurality of first touch-control electrodes 20 and the plurality of second touch-control electrodes 20. The driving unit 30 may be an integrated circuit, or electronic circuits formed inside the touch-control screen. The present disclosure does not limit the structure of the driving unit 30.

The operation of the touch-control screen may include the touch-control stage. In the touch-control stage, the touch-control operation may be performed on the touch-control screen.

In the touch-control stage of the touch-control screen, to save a power consumption of the touch-control screen, the driving unit 30 may respectively transmit electronic signals to the plurality of first touch-control electrodes 20 in the main touch-control area 11 and to the plurality of second touch-control electrodes 20 in the auxiliary touch-control area 12, such that the unit power consumption of the plurality of second touch-control electrodes 20 in the auxiliary touch-control area 12 is smaller than the unit power consumption of the plurality of first touch-control electrodes 20 in the main touch-control area 11. The unit power consumption may be equal to the power consumption of the first touch-control electrode 20 or the second touch-control electrode 20 divided by an area occupied by the first touch-control electrode 20 or the second touch-control electrode 20. In one embodiment, the area occupied by the first touch-control electrode 20 in the main touch-control area 11 may be the same as the area occupied by the second touch-control electrode 20 in the auxiliary touch-control area 12.

In one embodiment, the touch-control area 10 of the touch-control screen may include the main touch-control area 11 and the auxiliary touch-control area 12. The main touch-control area 11 may be substantially large. The auxiliary touch-control area 12 may be substantially small. The touch-control operations may occur relatively frequently in the main touch-control area 11 and may occur relatively infrequently in the auxiliary touch-control area 12. In one embodiment, the auxiliary touch-control area 12 may be in the periphery of the touch-control area 10. For example, the auxiliary touch-control area 12 may often display images about time, battery capacity, and the like. A user may rarely perform touch-control operations in the auxiliary touch-control area 12. The main touch-control area 11 may often display photos, videos, and webpages. The user may often perform sophisticated touch-control operations in the main touch-control area 11. In response, the touch-control screen may perform pre-defined functions or may display corresponding images.

Because the touch-control operations occur infrequently in the auxiliary touch-control area 12, the unit power consumption of the plurality of second touch-control electrodes 20 in the auxiliary touch-control area 12 may be reduced without degrading the touch-control performance of the touch-control screen. Thus, the power consumption of the touch-control screen may be saved.

In some embodiments, the touch-control screen may be an irregularly shaped touch-control screen. The touch-control screen provided by the existing technology may often have a rectangular shape. As the display technology advances, user's needs are becoming more and more diversified and personalized. The traditional rectangular-shaped touch-control screen may be insufficient to satisfy user's changing needs. Thus, non-rectangularly-shaped touch-control screens become the trend of new product development. The non-rectangularly-shaped touch-control screens can be collectively referred to as irregularly-shaped touch-control screens.

Figure 2:
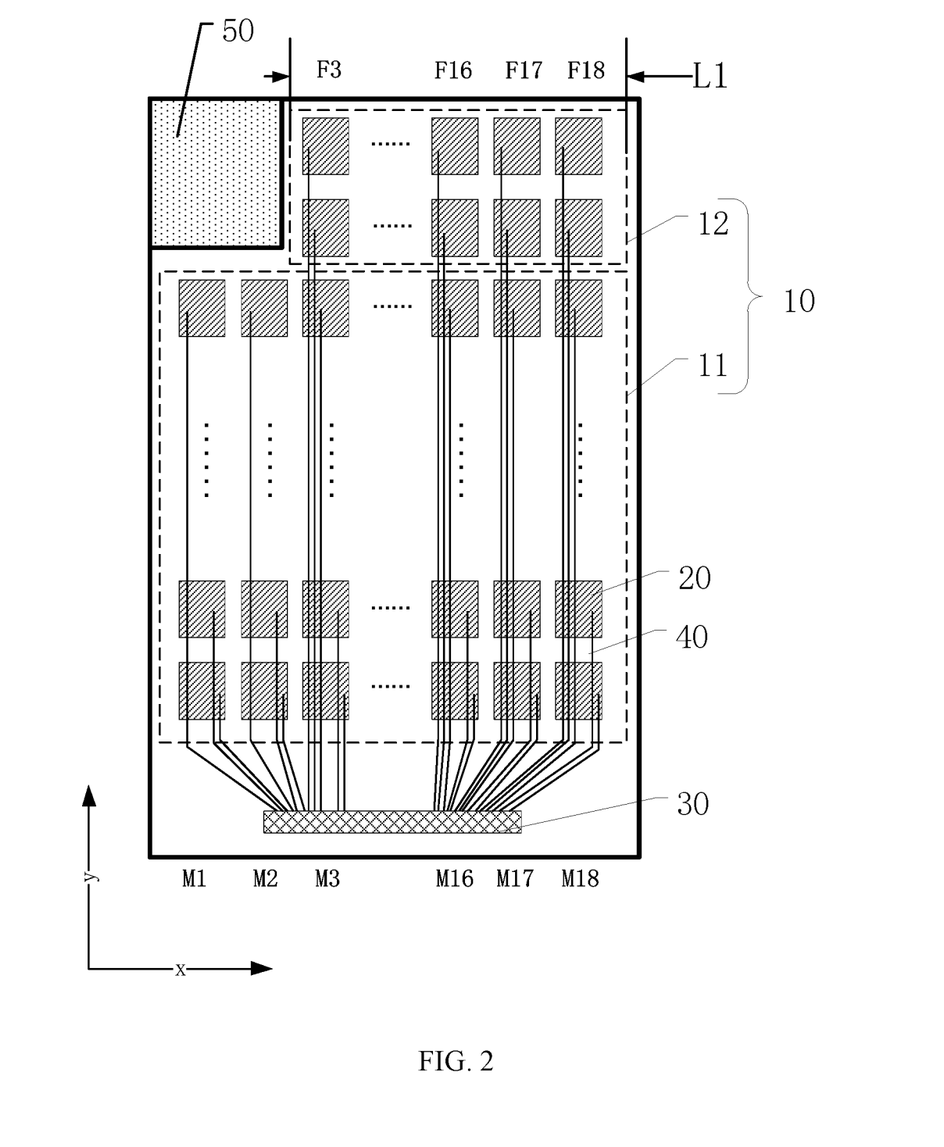
FIG. 2 illustrates a planar structural view of another exemplary touch-control screen according to disclosed embodiments.

FIG. 2 illustrates a planar structural view of another exemplary touch-control screen according to disclosed embodiments. In one embodiment, as shown in FIG. 2, the touch-control screen may include a first cutout 50. The first cutout 50 may extend through the entire touch-control screen in a thickness direction of the touch-control screen. The auxiliary touch-control area 12 may be disposed adjacent to the first cutout 50. In one embodiment, the touch-control screen may include the first cutout 50. The shape of the touch-control screen may be missing a corner. The touch-control screen in this shape may be an irregularly-shaped touch-control screen. After the touch-control screen is assembled in a terminal apparatus, electronic components such as a microphone, a camera, etc., of the terminal apparatus may be disposed in the area where the first cutout 50 is located.

In the touch-control screen provided by the embodiments of the present disclosure, due to the configuration of the first cutout 50, the auxiliary touch-control area 12 may be disposed adjacent to the first cutout 50. A length L1 of the auxiliary touch-control area 12 may be reduced due to the presence of the first cutout 50. Accordingly, the number of the second touch-control electrodes 20 disposed along a length direction of the auxiliary touch-control area 12 may decrease. In one embodiment, the auxiliary touch-control area 12 may display time and battery capacity, etc. The touch-control operations may occur relatively infrequently in the auxiliary touch-control area 12 or it is unnecessary to detect the touch-control operations in the auxiliary touch-control area 12.

In one embodiment, referring to FIG. 2, the plurality of first touch-control electrodes 20 and the plurality of second touch-control electrodes 20 may be arranged as an array along a first direction x and a second direction y. The first direction x may be perpendicular to the second direction y. The first cutout 50 and the auxiliary touch-control area 12 may be arranged along the first direction x. The plurality of first touch-control electrodes 20 and the plurality of second touch-control electrodes 20 may be arranged in a matrix.

In one embodiment, the auxiliary touch-control area 12 may be disposed adjacent to the first cutout 50. The touch-control operations may occur infrequently in the auxiliary touch-control area 12 or it is unnecessary to detect the touch-control operations in the auxiliary touch-control area 12. Reducing the unit power consumption of the plurality of second touch-control electrodes 20 in the auxiliary touch-control area 12 may have a minimal or negligible impact on the touch-control performance of the touch-control screen. Thus, the power consumption of the touch-control screen may be saved.

Figure 3:
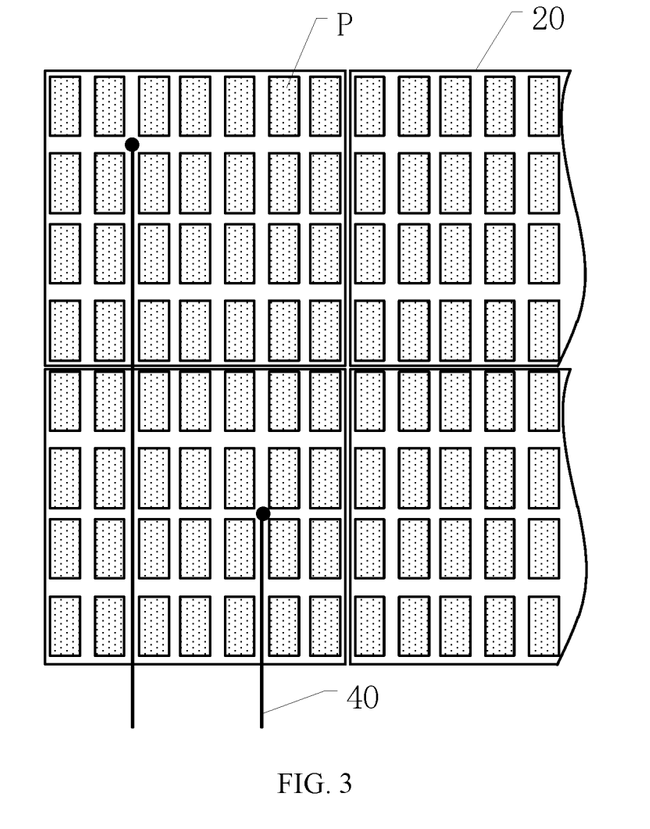
FIG. 3 illustrates a partial planar structural view of another exemplary touch-control screen according to disclosed embodiments.

FIG. 3 illustrates a partial planar structural view of another exemplary touch-control screen according to disclosed embodiments. In one embodiment, as shown in FIG. 3, the touch-control area 10 of the touch-control screen may include a plurality of pixels P.

For illustrative purposes, the plurality of first touch-control electrodes 20 and the plurality of second touch-control electrodes 20 of the touch-control screen in FIG. 3 are not shown with filler patterns, and instead are shown in solid line frames.

In the touch-control screen provided by the present disclosure, various methods may be used to reduce the unit power consumption of the plurality of second touch-control electrodes 20 in the auxiliary touch-control area 12. Exemplary methods of reducing the unit power consumption of the touch-control electrodes in the auxiliary touch-control area are described below.

In one embodiment, one way of reducing the unit power consumption of the plurality of second touch-control electrodes 20 in the auxiliary touch-control area 12 may be to reduce a scanning frequency of the plurality of second touch-control electrodes 20 in the auxiliary touch-control area 12. Referring to FIG. 1 or FIG. 2, in the touch-control stage, the driving unit 30 may be configured to drive the plurality of first touch-control electrodes 20 in the main touch-control area 11 at a scanning frequency S1, and the driving unit 30 may be configured to drive the plurality of second touch-control electrodes 20 in the auxiliary area 12 at a scanning frequency S2, where S2<S1.

For example, in the existing technology, the scanning frequency of the touch-control screen may be configured to be 60 Hz, or 120 Hz, etc. That is, in one second, the plurality of first touch-control electrodes 20 and the plurality of second touch-control electrodes 20 may be scanned 60 times or 120 times. The higher the scanning frequency, the more times that the touch-control screen is detected in one second, and the faster the touch-control screen responds to the touch-control operations.

In one embodiment, because the touch-control operations occur relatively infrequently in the auxiliary touch-control area 12 or it is unnecessary to detect the touch-control operations in the auxiliary touch-control area 12, the response speed to the touch-control operations may be properly reduced in the auxiliary touch-control area 12. That is, the scanning frequency of the plurality of second touch-control electrodes 20 in the auxiliary touch-control area 12 may be properly reduced. The unit power consumption of the plurality of second touch-control electrodes 20 in the auxiliary touch-control area 12 may be reduced by reducing the scanning frequency of the plurality of second touch-control electrodes 20 in the auxiliary touch-control area 12.

In one embodiment, S1=2*S2. For example, the scanning frequency of the plurality of first touch-control electrodes 20 in the main touch-control area 11 may be about 120 Hz, and the scanning frequency of the plurality of second touch-control electrodes 20 in the auxiliary touch-control area 12 may be about 60 Hz. The scanning frequency of the plurality of second touch-control electrodes 20 in the auxiliary touch-control area 12 cannot be too low. Excessively low scanning frequency may result in excessively slow response speed to the touch-control operations by the plurality of second touch-control electrodes 20 in the auxiliary touch-control area 12, thereby substantially degrading the performance of the touch-control screen.

Various methods may be used to reduce the scanning frequency of the plurality of second touch-control electrodes 20 in the auxiliary touch-control area 12. Two examples of reducing the scanning frequency of the plurality of second touch-control electrodes 20 in the auxiliary touch-control area 12 are described below.

Figure 4:
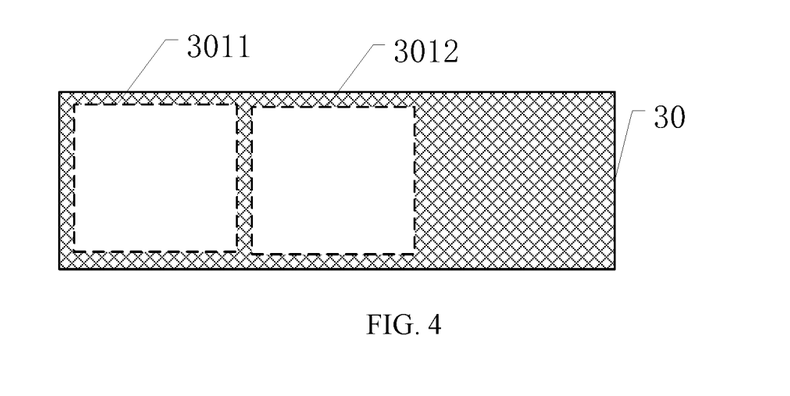
FIG. 4 illustrates a block diagram of an exemplary driving unit of an exemplary touch-control screen according to disclosed embodiments.

FIG. 4 illustrates a block diagram of an exemplary driving unit of an exemplary touch-control screen according to disclosed embodiments. As shown in FIG. 4, the driving unit 30 may include a first unit 3011 and a second unit 3012. The first unit 3011 may be configured to transmit the scanning signals to the main touch-control area 11 to control the scanning frequency of the plurality of first touch-control electrodes 20 in the main touch-control area 11. The second unit 3012 may be configured to transmit the scanning signals to the auxiliary touch-control area 12 to control the scanning frequency of the plurality of second touch-control electrodes 20 in the auxiliary touch-control area 12.

Figure 5:
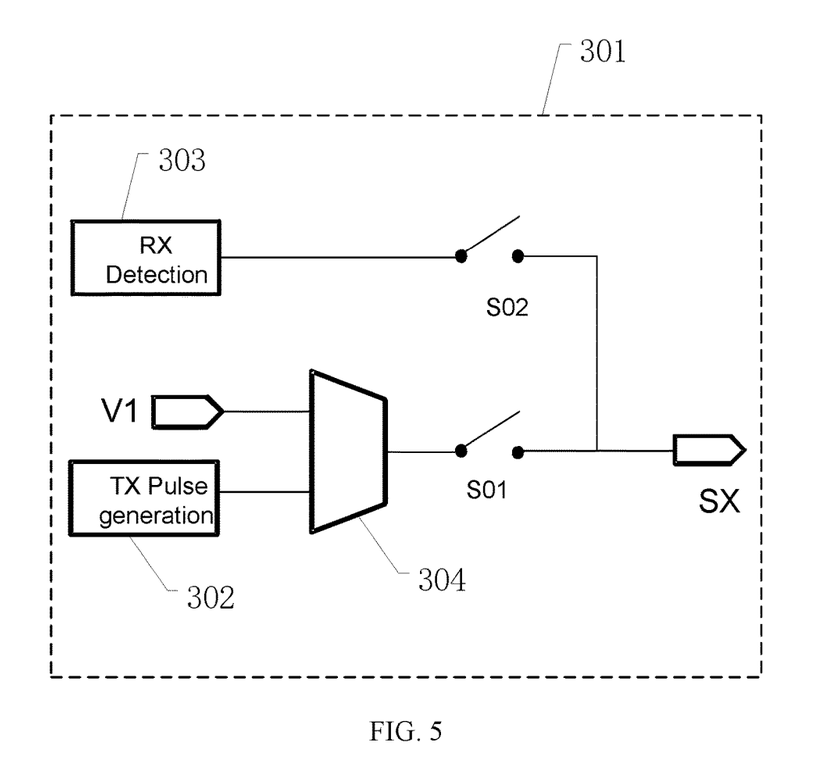
FIG. 5 illustrates a schematic diagram of an exemplary driving unit of an exemplary touch-control screen according to disclosed embodiments.

FIG. 5 illustrates a schematic diagram of an exemplary driving unit of an exemplary touch-control screen according to disclosed embodiments. The driving unit 30 may include a scanning frequency switching unit 301 shown in FIG. 5. As shown in FIG. 5, the scanning frequency switching unit 301 may include an output terminal SX, a touch-control signal detection unit (RX Detection) 303, a first voltage signal input terminal V1, a touch-control signal transmitting unit (TX Pulse generation) 302, and a selection unit 304.

The output terminal SX may be electrically connected to the first touch-control electrode 20 in the main touch-control area 11 or the second touch-control electrode 20 in the auxiliary touch-control area 12. The touch-control signal transmitting unit 302 may be configured to transmit a touch-control transmitting signal. The touch-control transmitting signal may often be a pulse signal. The touch-control transmitting signal may charge the first touch-control electrode 20 or the second touch-control electrode 20 to form a coupling capacitor between the first touch-control electrode 20 and a ground or between the second touch-control electrode 20 and the ground to detect any touch-control operation. The first voltage signal input terminal V1 may be configured to supply a constant voltage signal. The touch-control signal detection unit 303 may be configured to detect a self-capacitance of the first touch-control electrode 20 or the second touch-control electrode 20, that is, a touch-control detection signal caused by a touch-control operation. The first voltage signal input terminal V1 and the touch-control signal transmitting unit 302 may be electrically connected to the selection unit 304. The selection unit 304 may be configured to selectively output one of an electrical signal of the first voltage signal input terminal V1 and an electrical signal of the touch-control transmitting unit 302.

The selection unit 304 may be electrically connected to the output terminal SX through a first switch S01. The touch-control signal detection unit 303 may be electrically connected to the output terminal SX through a second switch S02.

The scanning frequency switching unit 301 may have an operation stage including a touch-control detection stage and a constant voltage stage. In the touch-control detection stage, the first switch S01 and the second switch S02 may open and close alternately. When the first switch S01 closes and the second switch S02 opens, the touch-control signal transmitting unit 302 may charge the first touch-control electrode 20 or the second touch-control electrode 20. When the first switch S01 opens and the second switch S02 closes, the first touch-control electrode 20 or the second touch-control electrode 20 may discharge through the touch-control signal detection unit 303. Thus, the self-capacitance of the first touch-control electrode 20 or the second touch-control electrode may be detected, and the touch-control detection signal caused by the touch-control operation may be detected.

In the constant voltage stage, the first switch S01 closes and the second switch S02 opens, and the scanning frequency switching unit 301 may output the electrical signal of the first voltage signal input terminal V1 to the first touch-control electrode 20 or the second touch-control electrode 20.

Within a time period of one frame, the scanning frequency switching unit 301 electrically connected to the first touch-control electrode 20 in the main touch-control area 11 may operate in the constant voltage stage for a time period t1, and the scanning frequency switching unit 301 electrically connected to the second touch-control electrode 20 in the auxiliary touch-control area 12 may operate in the constant voltage stage for a time period t2, where t1<t2.

In one embodiment, for illustrative purposes, the scanning frequency of the plurality of first touch-control electrodes 20 in the main touch-control area 11 may be about 120 Hz, and the scanning frequency of the plurality of second touch-control electrodes 20 in the auxiliary touch-control area 12 may be about 60 Hz. The operation mode of the scanning frequency switching unit 301 is described below. Within a time period of one frame, the plurality of first touch-control electrodes 20 in the main touch-control area 11 may be scanned twice while the plurality of second touch-control electrodes 20 in the auxiliary touch-control area 12 may be scanned only once. Within the time period of one frame, when the plurality of first touch-control electrodes 20 in the main touch-control area 11 is scanned for a first time, the plurality of second touch-control electrodes 20 in the auxiliary touch-control area 12 may also be scanned. When the plurality of first touch-control electrodes 20 in the main touch-control area 11 is scanned for a second time, the first switch S01 closes, and the second switch S02 opens in the scanning frequency switching unit 301 electrically connected to the second touch-control electrode 20 in the auxiliary touch-control area 12. The scanning frequency switching unit 301 may output the electrical signal of the first voltage signal input terminal V1 to the first touch-control electrode 20 or the second touch-control electrode 20. Because the touch-control signal detection unit 303 is turned off without performing the function of detecting the touch-control detection signal, the power consumption may be saved.

In one embodiment, within the time period of one frame, during a first scanning, the scanning frequency switching unit 301 electrically connected to the first touch-control electrode 20 in the main touch-control area 11 and the scanning frequency switching unit 301 electrically connected to the second touch-control electrode 20 in the auxiliary touch-control area 12 may operate in the constant voltage stage for a same time period. During a second scanning, the scanning frequency switching unit 301 electrically connected to the first touch-control electrode 20 in the main touch-control area 11 may operate in the constant voltage stage for a shorter time period than the scanning frequency switching unit 301 electrically connected to the second touch-control electrode 20 in the auxiliary touch-control area 12.

A portion of or the entire structure of the scanning frequency switching unit 301 may be integrated into an integrated circuit chip. A portion of or the entire structure of the scanning frequency switching unit 301 may be integrated into the touch-control screen. No limitation is imposed by the present disclosure.

Figure 6:
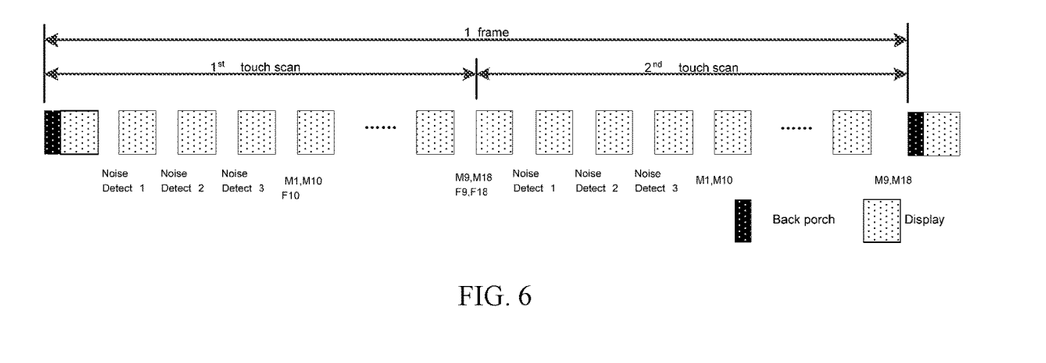
FIG. 6 illustrates a schematic view of an exemplary method of scanning another exemplary touch-control screen according to disclosed embodiments.

FIG. 6 illustrates a schematic view of an exemplary method of scanning another exemplary touch-control screen according to disclosed embodiments. Referring to FIG. 2, FIG. 5, and FIG. 6, another method of scanning the plurality of first touch-control electrodes 20 and the plurality of second touch-control electrodes 20 is described below.

In FIG. 2, the plurality of first touch-control electrodes 20 or the plurality of second touch-control electrodes 20 arranged in a same column in the second direction y may be referred to one column of the first touch-control electrodes 20 or the second touch-control electrodes 20. The main touch-control area 11 may include 18 columns of the first touch-control electrodes 20, which are column M1 of the first touch-control electrodes 20 through column M18 of the first touch-control electrodes 20, respectively. The auxiliary touch-control area 12 may include 16 columns of the second touch-control electrodes 20, which are column F3 of the second touch-control electrodes 20 through column F18 of the second touch-control electrodes 20, respectively. Obviously, because of the first cutout 50, the auxiliary touch-control area 12 cannot include columns F1 of the second touch-control electrodes 20 or column F2 of the second touch-control electrodes 20. In one embodiment, the touch-control screen in FIG. 2 may have the display function. The plurality of first touch-control electrodes 02 and the plurality of second touch-control electrodes 20 may be multiplexed as a common electrode. Within the time period of one frame, the plurality of first touch-control electrodes 20 and the plurality of second touch-control electrodes 20 of the touch-control screen may operate alternately between the display stage and the touch-control detection stage. At the beginning of one frame, back porch may represent a vertical synchronization phase at the beginning of an image frame.

For example, within the time period of one frame, the plurality of first touch-control electrodes 20 in the main touch-control area 11 may be scanned twice. The plurality of second touch-control electrodes 20 in the auxiliary touch-control area 12 may be scanned only once. When the plurality of first touch-control electrodes 20 in the main touch-control area 11 is scanned for the first time (first touch scan), the plurality of first touch-control electrodes 20 may first detect noises (Noise Detect 1, Noise Detect 2, and Noise Detect 3). The plurality of first touch-control electrodes 20 may operate alternately between the noise detection stage and the display stage. Column M1 of the first touch-control electrodes 20 and column 10 of the first touch-control electrodes 20 may operate in the touch-control detection stage at the same time. The plurality of first touch-control electrodes 20 may operate alternately between the touch-control detection stage and the display stage until column M9 of the first touch-control electrodes 20 and column M18 of the first touch-control electrodes 20 operate at the touch-control detection stage at the same time. During the first touch scan, the plurality of second touch-control electrodes 20 in the auxiliary touch-control area 12 may be scanned once. Because column F1 of the second touch-control electrodes 20 and column F2 of the second touch-control electrodes 20 are supposed to be disposed in the auxiliary touch-control area 12, the columns of the second touch-control electrodes 20 absent in the auxiliary touch-control area 12 cannot operate in the touch-control detection stage or the display stage. During the first touch scan, the columns of the first touch-control electrodes 20 in the main touch-control area 11 may complete the touch-control detection stage once, and the columns o the second touch-control electrodes 20 in the auxiliary touch-control area 12 may also complete the touch-control detection stage once.

During the second touch scan, the plurality of first touch-control electrodes 20 may first detect noises (Noise Detect 1, Noise Detect 2, and Noise Detect 3). The plurality of first touch-control electrodes 20 may operate alternately between the noise detection stage and the display stage. Column M1 of the first touch-control electrodes 20 and column M10 of the first touch-control electrodes 20 may operate in the touch-control detection stage at the same time. The plurality of first touch-control electrodes 20 may operate alternately between the touch-control detection stage and the display stage until column M9 of the first touch-control electrodes 20 and column M18 of the first touch-control electrodes 20 operate at the touch-control detection stage at the same time. During the second touch scan, the plurality of second touch-control electrodes 20 in the auxiliary touch-control area 12 would not perform the touch-control detection, and may only receive the electrical signal of the first voltage signal input terminal V1. The first voltage signal input terminal V1 may output a common voltage signal for displaying. During the second touch scan, it is unnecessary for the plurality of second touch-control electrodes 20 in the auxiliary touch-control area 12 to perform the touch-control detection. Thus, the power consumption of the touch-control screen may be reduced.

In one embodiment, another way of reducing the unit power consumption of the plurality of second touch-control electrodes 20 in the auxiliary touch-control area 12 may be to reduce the driving voltage of the plurality of second touch-control electrodes 20 in the auxiliary touch-control area 12. Referring to FIG. 1 or FIG. 2, in the touch-control stage, the driving unit 30 may be configured to drive the plurality of first touch-control electrodes 20 in the main touch-control area 11 at a driving voltage v1, and the driving unit 30 may be configured to drive the plurality of second touch-control electrodes 20 in the auxiliary touch-control area 12 at a driving voltage v2, where v2<v1. The greater the touch-control voltage received by the plurality of first touch-control electrodes 20 or the plurality of second touch-control electrodes 20, the wider the range of the touch-control signal caused by the touch-control operation. The wide range of the touch-control signal may be beneficial to overcoming the noise disturbance and increasing the accuracy of the touch-control detection. Because the touch-control operations occur infrequently in the auxiliary touch-control area 12 or it is unnecessary to detect the touch-control operations in the auxiliary touch-control area 12, the accuracy of the touch-control detection in the auxiliary touch-control area 12 may be properly reduced, that is, the driving voltage of the plurality of second touch-control electrodes 20 in the auxiliary touch-control area 12 may be properly reduced. The unit power consumption of the plurality of second touch-control electrodes 20 in the auxiliary touch-control area 12 may be reduced by reducing the driving voltage of the plurality of second touch-control electrodes 20 in the auxiliary touch-control area 12.

Various methods may be used to reduce the unit power consumption of the plurality of second touch-control electrodes 20 in the auxiliary touch-control area 12. The present disclosure merely provides some embodiments of reducing the unit power consumption of the touch-control electrodes 20 in the auxiliary touch-control area 12 for illustrative purposes. The methods are not limited by the present disclosure.

In some embodiments, referring to FIG. 1 or FIG. 2, the operation stage of the touch-control screen may also include a standby stage. In the standby stage, the driving unit 30 may be configured to drive the plurality of second touch-control electrodes 20 in the auxiliary touch-control area 12 at a scanning frequency S3 to detect presence of a wake-up operation. When the wake-up operation is present, the touch-control screen may enter the touch-control stage.

In the standby stage, the driving unit 30 may be configured to drive the plurality of first touch-control electrodes 20 in the main touch-control area 11 at a scanning frequency of 0.

In one embodiment, the standby stage and the touch-control stage may be two independent operation stages. In the standby stage, the touch-control screen may only detect the presence of the wake-up operation and would not detect or interpret any specific operations to perform pre-defined functions or display corresponding images. For example, the plurality of first touch-control electrodes 20 in the main touch-control area 11 of the touch-control screen may be in a sleeping state. The driving unit 30 may be configured to only drive the plurality of second touch-control electrodes 20 in the auxiliary touch-control area 12 to detect the wake-up operation. Because the wake-up operation does not require a high accuracy of detecting the touch-control operation or a fast response speed of the touch-control operation, the scanning frequency S3 of the plurality of second touch-control electrodes 20 in the auxiliary touch-control area 12 may be low, and may be lower than the scanning frequency of the plurality of second touch-control electrodes 20 in the auxiliary touch-control area 12 during the touch-control stage. The driving voltage of the plurality of second touch-control electrodes 20 in the auxiliary touch-control area 12 may also be low, for example, may be lower than the driving voltage of the plurality of second touch-control electrodes 20 in the auxiliary touch-control area 12 during the touch-control stage.

After the plurality of second touch-control electrodes 20 in the auxiliary touch-control area 12 detect the wake-up operation, the touch-control screen may enter the touch-control stage to perform the normal touch-control detection.

In the standby stage, only the plurality of second touch-control electrodes 20 in the auxiliary touch-control area 12 that occupies a small area of the touch-control screen may operate to detect the presence of the wake-up operation rather than requiring both the plurality of first touch-control electrodes 20 and the plurality of second touch-control electrodes 20 of the entire touch-control screen to detect the wake-up operation. Thus, the power consumption of the touch-control screen may be further reduced.

Figure 7:
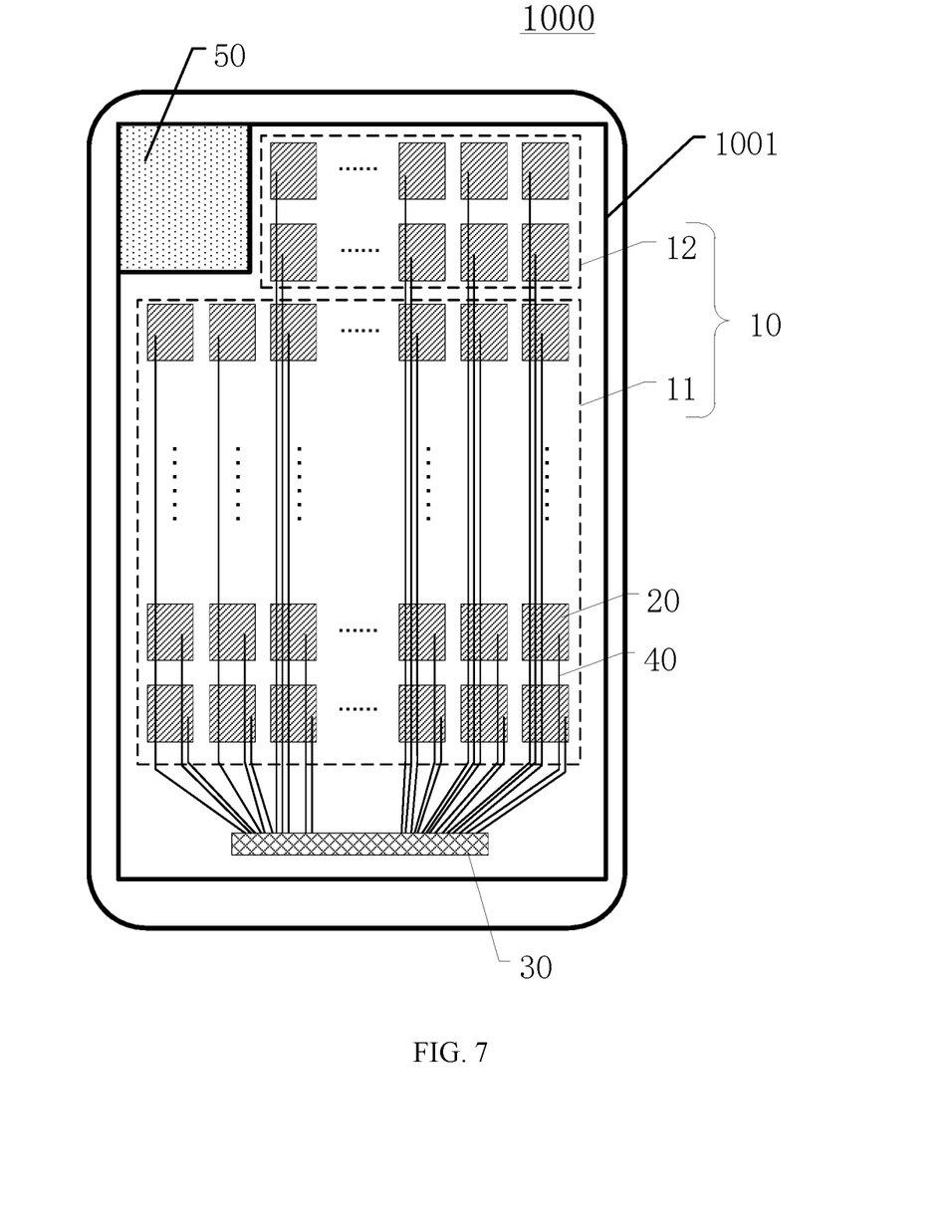
FIG. 7 illustrates a structural view of an exemplary display apparatus according to disclosed embodiments.

The present disclosure provides a touch-control apparatus, which includes the disclosed touch-control screen. FIG. 7 illustrates a structural view of an exemplary display apparatus according to disclosed embodiments. The display apparatus 1000 in FIG. 7 may include a touch-control screen 1001 provided by any of the embodiments of the present disclosure. For illustrative purposes, a smart phone is shown in FIG. 7 to describe the display apparatus 1000. In one embodiment, the touch-control screen 1001 may include a first cutout 50. The first cutout 50 may extend through the touch-control screen 1001 in a thickness direction of the touch-control screen 1001. An auxiliary touch-control area 12 may be disposed adjacent to the first cutout 50. Electronic components such as a microphone, a camera, etc., of a terminal apparatus may be disposed in the area where the first cutout 50 is located. The first cutout 50 may be disposed in various positions. For illustrative purposes, the first cutout 50 is shown in FIG. 7 in the upper portion of the touch-control apparatus. In other embodiments, the first cutout 50 may be disposed in other positions of the touch-control apparatus.

Figure 8:
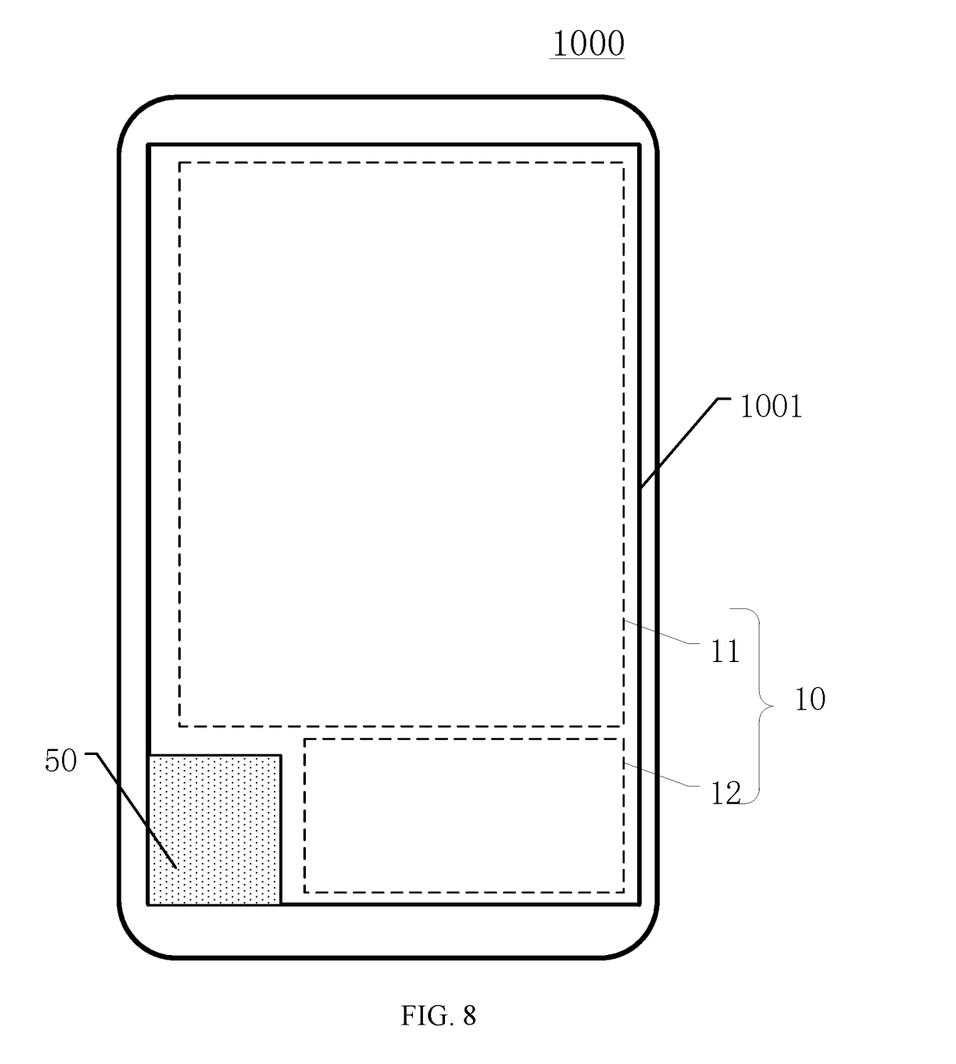
FIG. 8 illustrates a structural view of another exemplary display apparatus according to disclosed embodiments.

FIG. 8 illustrates a structural view of another exemplary display apparatus according to disclosed embodiments. As shown in FIG. 8, the first cutout 50 is disposed in the lower portion of the touch-control apparatus.

The display apparatus 1000 provided by the embodiments of the present disclosure may be a computer, a television set, a vehicle-mounted display apparatus, or other display apparatus having a display function, which is not limited by the present disclosure. The display apparatus 1000 provided by the embodiments of the present disclosure may include the desired benefits of the touch-control screen 1001 provided by the embodiments of the present disclosure, which can be referred to the description of the touch-control screen 1001 and will not be repeated hereinafter.

The present disclosure also provides a method of driving the touch-control screen.

In one embodiment, referring to FIG. 1, the touch-control screen may include a touch-control area 10. The touch-control area 10 may include a plurality of touch-control electrodes 20. The touch-control area 10 may include a main touch-control area 11 and an auxiliary touch-control area 12. The auxiliary touch-control area 12 may be smaller than the main touch-control area 11.

The driving method may include: in a touch-control stage of the touch-control screen, respectively transmitting electrical signals to a plurality of first touch-control electrodes 20 in the main touch-control area 11 and to a plurality of second touch-control electrodes 20 in the auxiliary touch-control area 12, such that a unit power consumption of the plurality of second touch-control electrodes 20 in the auxiliary touch-control area 12 is smaller than a unit power consumption of the plurality of first touch-control electrodes 20 in the main touch-control area 11.

In the driving method provided by the present disclosure, the touch-control area 10 of the touch-control screen may include the main touch-control area 11 and then auxiliary touch-control area 12. The main touch-control area 11 may be substantially large. The auxiliary touch-control area 12 may be substantially small. The touch-control operations may occur relatively frequently in the main touch-control area 11 and may occur relatively infrequently in the auxiliary touch-control area 12. In one embodiment, the auxiliary touch-control area 12 may be located in the periphery of the touch-control area 10. For example, the auxiliary touch-control area 12 may often display images about time, battery capacity, and the like. A user may rarely perform touch-control operations in the auxiliary touch-control area 12. The main touch-control area 11 may often display photos, videos, and webpages. The user may often perform sophisticated touch-control operations in the main touch-control area 11. In response, the touch-control screen may perform pre-defined functions or display corresponding images.

Because the touch-control operations occur infrequently in the auxiliary touch-control area 12, the unit power consumption of the plurality of second touch-control electrodes 20 in the auxiliary touch-control area 12 may be reduced without degrading the touch-control performance of the touch-control screen. Thus, the power consumption of the touch-control screen may be saved.

In the driving method provided by the present disclosure, various methods may be used to reduce the unit power consumption of the plurality of second touch-control electrodes 20 in the auxiliary touch-control area 12. Exemplary methods of reducing the unit power consumption of the plurality of second touch-control electrodes 20 in the auxiliary touch-control area 12 are described below.

In one embodiment, one way of reducing the unit power consumption of the plurality of second touch-control electrodes 20 in the auxiliary touch-control area 12 may be to reduce a scanning frequency of the plurality of second touch-control electrodes in the auxiliary touch-control area 12. Referring to FIG. 1 or FIG. 2, in the touch-control stage, the driving unit 30 may be configured to drive the plurality of first touch-control electrodes 20 in the main touch-control area 11 at a scanning frequency S1, and the driving unit 30 may be configured to drive the plurality of second touch-control electrodes 20 in the auxiliary area 12 at a scanning frequency S2, where S2<S1.

In one embodiment, because the touch-control operations occur relatively infrequently in the auxiliary touch-control area 12 or it is unnecessary to detect the touch-control operations in the auxiliary touch-control area 12, the response speed to the touch-control operations may be properly reduced in the auxiliary touch-control area 12. That is, the scanning frequency of the plurality of second touch-control electrodes 20 in the auxiliary touch-control area 12 may be properly reduced. The unit power consumption of the touch-control electrodes 20 in the auxiliary touch-control area 12 may be reduced by reducing the scanning frequency of the plurality of second touch-control electrodes 20 in the auxiliary touch-control area 12.

In one embodiment, S1=2*S2. For example, the scanning frequency of the plurality of first touch-control electrodes 20 in the main touch-control area 11 may be about 120 Hz, and the scanning frequency of the plurality of second touch-control electrodes 20 in the auxiliary touch-control area 12 may be about 60 Hz. The scanning frequency of the plurality of second touch-control electrodes 20 in the auxiliary touch-control area 12 cannot be too low. Excessively low scanning frequency may result in excessively slow response speed to the touch-control operations by the plurality of second touch-control electrodes 20 in the auxiliary touch-control area 12, thereby substantially degrading the performance of the touch-control screen.

In one embodiment, another way of reducing the unit power consumption of the plurality of second touch-control electrodes 20 in the auxiliary touch-control area 12 may be to reduce the driving voltage of the plurality of second touch-control electrodes 20 in the auxiliary touch-control area 12. Referring to FIG. 1 or FIG. 2, in the touch-control stage, the driving unit 30 may be configured to drive the plurality of first touch-control electrodes 20 in the main touch-control area 11 at a driving voltage v1, and the driving unit 30 may be configured to drive the plurality of second touch-control electrodes 20 in the auxiliary touch-control area 12 at a driving voltage v2, where v2<v1. The greater the touch-control voltage received by the plurality of first touch-control electrodes 20 or the plurality of second touch-control electrodes 20, the wider the range of the touch-control signal caused by the touch-control operation. The wide range of the touch-control signal may be beneficial to overcoming the noise disturbance and increasing the accuracy of the touch-control detection. Because the touch-control operations occur infrequently in the auxiliary touch-control area 12 or it is unnecessary to detect the touch-control operations in the auxiliary touch-control area 12, the accuracy of the touch-control detection in the auxiliary touch-control area 12 may be properly reduced, that is, the driving voltage of the plurality of second touch-control electrodes 20 in the auxiliary touch-control area 12 may be properly reduced. The unit power consumption of the plurality of second touch-control electrodes 20 in the auxiliary touch-control area 12 may be reduced by reducing the driving voltage of the plurality of second touch-control electrodes 20 in the auxiliary touch-control area 12.

In some embodiments, referring to FIG. 1, in the driving method provided by the embodiments of the present disclosure, the touch-control screen may further operate in a standby stage.

In the standby stage, the scanning frequency of the plurality of second touch-control electrodes 20 in the auxiliary touch-control area 12 may be S3 to detect presence of a wake-up operation. When the wake-up operation is present, the touch-control screen may enter the touch-control stage.

In the standby stage, the scanning frequency of the plurality of first touch-control electrodes 20 in the main touch-control area 11 may be 0.

In the standby stage of the driving method provided by the embodiments of the present disclosure, only the plurality of second touch-control electrodes 20 in the auxiliary touch-control area 12 that occupies a small area may operate to detect the presence of the wake-up operation. It is unnecessary for both the plurality of first touch-control electrodes 20 and the plurality of second touch-control electrodes 20 of the entire touch-control screen to detect the presence of the wake-up operation. Thus, the power consumption of the touch-control screen may be further reduced.

In some embodiments, referring to FIG. 2, in the driving method provided by the embodiments of the present disclosure, the touch-control screen may include a first cutout 50. The first cutout 50 may extend through the entire touch-control screen in a thickness direction of the touch-control screen. An auxiliary touch-control area 12 may be disposed adjacent to the first cutout 50.

In one embodiment, the touch-control screen may include the first cutout 50. The shape of the touch-control screen may be missing a corner. The touch-control screen in this shape may be an irregularly-shaped touch-control screen.

In one embodiment, due to the configuration of the first cutout 50, the auxiliary touch-control area 12 may be disposed adjacent to the first cutout 50. A length L1 of the auxiliary touch-control area 12 may be reduced due to the presence of the first cutout 50. Accordingly, the number of the second touch-control electrodes 20 disposed along the length direction of the auxiliary touch-control area 12 may decrease.

In one embodiment, the auxiliary touch-control area 12 may display time and battery capacity, etc. The touch-control operations may occur relatively infrequently in the auxiliary touch-control area 12 or it is unnecessary to detect the touch-control operations in the auxiliary touch-control area 12. Reducing the unit power consumption of the plurality of second touch-control electrodes 20 in the auxiliary touch-control area 12 may have a minimal or negligible impact on the touch-control performance of the touch-control screen. Thus, the power consumption of the touch-control screen may be saved.

In this manner, the touch-control screen, the driving method thereof, and the touch-control apparatus provided by the embodiments of the present disclosure provide at least the following beneficial effects. In the touch-control screen, the touch-control area may include the main touch-control area and the auxiliary touch-control area. The main touch-control area may be relatively large. The auxiliary touch-control area may be relatively small. The touch-control operations may occur frequently in the main touch-control area and may occur infrequently in the auxiliary touch-control area. Because the touch-control operations occur infrequently in the auxiliary touch-control area, reducing the unit power consumption of the plurality of second touch-control electrodes in the auxiliary touch-control area may have minimal impact on the touch-control performance of the touch-control screen. Thus, the power consumption of the touch-control screen may be saved.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A touch-control screen, comprising:
   a touch-control area and a driving unit, wherein:
   the touch-control area on the touch-control screen is divided into areas including a main touch-control area and an auxiliary touch-control area smaller than the main touch-control area;
   the touch-control area further includes a plurality of touch-control electrodes, the plurality of touch-control electrodes including:
   a plurality of first touch-control electrodes arranged in the main touch-control area, and
   a plurality of second touch-control electrodes arranged in the auxiliary touch-control area; and
   in a touch-control stage, the driving unit is configured to transmit electrical signals respectively to the plurality of first touch-control electrodes in the main touch-control area and to the plurality of second touch-control electrodes in the auxiliary touch-control area, wherein a unit power consumption of the plurality of second touch-control electrodes in the auxiliary touch-control area is smaller than a unit power consumption of the plurality of first touch-control electrodes in the main touch-control area.

2. The touch-control screen according to claim 1, wherein:

in the touch-control stage, the driving unit is configured to drive the plurality of first touch-control electrodes in the main touch-control area at a scanning frequency of S1, and the driving unit is configured to drive the plurality of second touch-control electrodes in the auxiliary touch-control area at a scanning frequency of S2, wherein S2<S1.

3. The touch-control screen according to claim 2, wherein:

$$S1=2*S2.$$

4. The touch-control screen according to claim 2, further including a scanning frequency switching unit, wherein the scanning frequency switching unit includes:
an output terminal, electrically connected to a first touch-control electrode of the plurality of first touch-control electrodes in the main touch-control area or a second touch-control electrode of the plurality of second touch-control electrodes in the auxiliary touch-control area;
a touch-control signal detection unit, configured to detect a self-capacitance of the first touch-control electrode in the main touch-control area or the second touch-control electrode in the auxiliary touch-control area, caused by a touch-control operation;
a first voltage signal input terminal, configured to supply a constant voltage signal;
a touch-control signal transmitting unit, configured to transmit a touch-control transmitting signal to charge the first touch-control electrode in the main touch-control area or the second touch-control electrode in the auxiliary touch-control area to form a coupling capacitor between the first touch-control electrode and a ground or between the second touch-control electrode and the ground to detect the touch-control operation; and
a selection unit, configured to selectively output one of an electrical signal of the first voltage signal input terminal and an electrical signal of the touch-control signal transmitting unit, wherein the selection unit is electrically connected to the output terminal through a first switch and the touch-control signal detection unit is electrically connected to the output terminal through a second switch.

5. The touch-control screen according to claim 4, wherein:
the scanning frequency switching unit has an operation stage including: a touch-control detection stage and a constant voltage stage;
in the touch-control detection stage, the first switch and the second switch open and close alternately;
when the first switch closes and the second switch opens, the touch-control signal transmitting unit charges the touch-control electrode;
when the first switch opens and the second switch closes, the first touch-control electrode in the main touch-control area or the second touch-control electrode in the auxiliary touch-control area discharges through the touch-control signal detection unit; and
in the constant voltage stage, the first switch closes, the second switch opens, and the frequency switching unit outputs the electrical signal of the first voltage signal input terminal to the first touch-control electrode in the main touch-control area or the second touch-control electrode in the auxiliary touch-control area, wherein:
the scanning frequency switching unit electrically connected to the first touch-control electrode in the main touch-control area operates in the constant voltage stage for a time period of t1, and the scanning frequency switching unit electrically connected to the second touch-control electrode in the auxiliary touch-control area operates in the constant voltage stage for a time period of t2, wherein t1<t2.

6. The touch-control screen according to claim 1, wherein:
in the touch-control stage, the driving unit is configured to drive the plurality of first touch-control electrodes in the main touch-control area at a driving voltage v1, and the driving unit is configured to drive the plurality of second touch-control electrodes in the auxiliary touch-control area at a driving voltage v2, wherein v2<v1.

7. The touch-control screen according to claim 1, further including:
a first cutout, passing through the touch-control screen in a thickness direction, wherein the auxiliary touch-control area is configured adjacent to the first cutout.

8. The touch-control screen according to claim 7, wherein:
the plurality of first touch-control electrodes in the main touch-control area and the plurality of second touch-control electrodes in the auxiliary touch-control area are arranged as an array along a first direction and a second direction perpendicular to the first direction; and
the first cutout and the auxiliary touch-control area are arranged in the first direction.

9. The touch-control screen according to claim 1, wherein:
the touch-control screen has an operation stage including a standby stage;
in the standby stage, the driving unit is configured to drive the plurality of second touch-control electrodes in the auxiliary touch-control area at a scanning frequency S3 to detect presence of a wake-up operation, and when a wake-up operation is present, the touch-control screen enters into the touch-control stage; and
in the standby stage, the driving unit is configured to drive the plurality of first touch-control electrodes in the main touch-control area at a scanning frequency 0.

10. The touch-control screen according to claim 1, wherein:
the touch-control area includes a plurality of pixels.

11. A touch-control apparatus, comprising a touch-control screen, the touch-control screen including a touch-control area and a driving unit, wherein:
the touch-control area on the touch-control screen is divided into areas including a main touch-control area and an auxiliary touch-control area smaller than the main touch-control area;
the touch-control area further includes a plurality of touch-control electrodes, the plurality of touch-control electrodes including a plurality of first touch-control electrodes arranged in the main touch-control area and a plurality of second touch-control electrodes arranged in the auxiliary touch-control area; and
in a touch-control stage, the driving unit is configured to transmit electrical signals respectively to the plurality of first touch-control electrodes in the main touch-control area and to the plurality of second touch-control electrodes in the auxiliary touch-control area, wherein a unit power consumption of the plurality of second touch-control electrodes in the auxiliary touch-control area is smaller than a unit power consumption of the plurality of first touch-control electrodes in the main touch-control area.

12. The touch-control apparatus according to claim 11, wherein:
in the touch-control stage, the driving unit is configured to drive the plurality of first touch-control electrodes in the main touch-control area at a scanning frequency of S1, and the driving unit is configured to drive the plurality of second touch-control electrodes in the auxiliary touch-control area at a scanning frequency of S2, wherein S2<S1.

13. The touch-control apparatus according to claim 12, wherein:

$$S1=2*S2.$$

14. The touch-control apparatus according to claim 12, further including a scanning frequency switching unit, wherein the scanning frequency switching unit includes:
an output terminal, electrically connected to a first touch-control electrode of the plurality of first touch-control electrodes in the main touch-control area or a second touch-control electrode of the plurality of second touch-control electrodes in the auxiliary touch-control area;
a touch-control signal detection unit, configured to detect a self-capacitance of the first touch-control electrode in the main touch-control area or the second touch-control electrode in the auxiliary touch-control area, caused by a touch-control operation;
a first voltage signal input terminal, configured to supply a constant voltage signal;
a touch-control signal transmitting unit, configured to transmit a touch-control transmitting signal to charge the first touch-control electrode in the main touch-control area or the second touch-control electrode in the auxiliary touch-control area to form a coupling capacitor between the first touch-control electrode and a ground or between the second touch-control electrode and the ground to detect the touch-control operation; and
a selection unit, configured to selectively output one of an electrical signal of the first voltage signal input terminal and an electrical signal of the touch-control signal transmitting unit, wherein the selection unit is electrically connected to the output terminal through a first switch and the touch-control signal detection unit is electrically connected to the output terminal through a second switch.

15. A method of driving a touch-control screen, the touch-control screen including a touch-control area and a driving unit, wherein:
the touch-control area on the touch-control screen is divided into areas including a main touch-control area and an auxiliary touch-control area smaller than the main touch-control area;

the touch-control area further includes a plurality of touch-control electrodes, the plurality of touch-control electrodes including a plurality of first touch-control electrodes arranged in the main touch-control area and a plurality of second touch-control electrodes arranged in the auxiliary touch-control area; and the method includes, in a touch-control stage, transmitting electrical signals respectively to the plurality of first touch-control electrodes in the main touch-control area and to the plurality of second touch-control electrodes in the auxiliary touch-control area, wherein a unit power consumption of the plurality of second touch-control electrodes in the auxiliary touch-control area is smaller than a unit power consumption of the plurality of first touch-control electrodes in the main touch-control area.

16. The method according to claim 15, wherein:
in the touch-control stage, the driving unit is configured to drive the plurality of first touch-control electrodes in the main touch-control area at a scanning frequency of S1, and the driving unit is configured to drive the plurality of second touch-control electrodes in the auxiliary touch-control area at a scanning frequency of S2, wherein S2<S1.

17. The method according to claim 16, wherein:

$$S1=2*S2.$$

18. The method according to claim 15, wherein:
in the touch-control stage, the driving unit is configured to drive the plurality of first touch-control electrodes in the main touch-control area at a driving voltage v1, and the driving unit is configured to drive the plurality of second touch-control electrodes in the auxiliary touch-control area at a driving voltage v2, wherein v2<v1.

19. The method according to claim 15, wherein the touch-control screen has an operation stage including a standby stage, further including:
in the standby stage, driving the plurality of second touch-control electrodes in the auxiliary touch-control area at a scanning frequency S3 to detect presence of a wake-up operation, and when a wake-up operation is present, entering the touch-control stage of the touch-control screen; and
in the standby stage, driving the plurality of first touch-control electrodes in the main touch-control area at a scanning frequency 0.

20. The method according to claim 15, wherein:
the touch-control screen further includes a first cutout, passing through the touch-control screen in a thickness direction, wherein the auxiliary touch-control area is configured adjacent to the first cutout.

* * * * *